UNITED STATES PATENT OFFICE.

OTTO BONHOEFFER, OF ELBERFELD, GERMANY, ASSIGNOR TO THE FARBENFABRIKEN OF ELBERFELD CO., OF NEW YORK, N. Y.

METHYLETHYLCARBINOLURETHANE AND PROCESS OF MAKING SAME.

SPECIFICATION forming part of Letters Patent No. 675,540, dated June 4, 1901.

Application filed October 23, 1899. Serial No. 734,545. (Specimens.)

*To all whom it may concern:*

Be it known that I, OTTO BONHOEFFER, doctor of philosophy and chemist, of Elberfeld, Germany, (assignor to the FARBENFABRIKEN OF ELBERFELD COMPANY, of New York,) have invented a new and useful Improvement in the Manufacture of Pharmaceutical Compounds, of which the following is a specification.

My invention relates to the preparation of a new pharmaceutical product which is chemically methylethylcarbinolurethane or carbamic ether of methylethylcarbinol having the formula

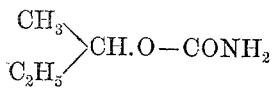

and which possesses valuable therapeutic, especially soporific, properties.

The process for producing my new compound consists in allowing urea or salts thereof to act on methylethylcarbinol in a suitable manner.

In order to carry out my process practically, I can, for instance, proceed as follows: Five parts, by weight, of methylethylcarbinol are mixed with eight parts, by weight, of urea nitrate, and the resulting mixture is heated in a closed vessel under pressure for, say, five hours at about from 125° to 130° centigrade. After cooling the mass is dissolved in a small quantity of water and the solution thus produced is extracted by means of ether or benzene. On evaporating the resulting solution the new methylethylcarbinolurethane is obtained. When crystallized from water, it forms white needles melting at 94° centigrade. It is readily soluble in benzene, alcohol, ether, carbon tetra chlorid, and also in hot ligroin.

According to my investigations the new compound possesses valuable therapeutic properties and can be used in medicine as a soporific, an average dose being between two and three grams.

Having now described my invention and in what manner the same is to be performed, what I claim as new, and desire to secure by Letters Patent, is—

1. The process for the production of methylethylcarbinolurethane which process consists in causing urea nitrate to act on methylethylcarbinol, isolating the so-formed methylethylcarbinolurethane and subsequently purifying the same.

2. As a new article of manufacture the methylethylcarbinolurethane having the formula

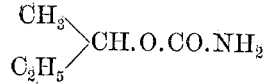

forming when crystallized from water white needles melting at 94° centigrade, being soluble in alcohol, benzene, ether, carbon tetra chlorid also in hot ligroin and adapted for being used in medicine as a soporific.

In testimony whereof I have signed my name in the presence of two subscribing witnesses.

OTTO BONHOEFFER.

Witnesses:
 R. E. JAHN,
 OTTO KÖNIG.